US012773886B2

(12) United States Patent
Nam

(10) Patent No.: US 12,773,886 B2
(45) Date of Patent: Oct. 27, 2026

(54) FRAME ASSEMBLY AND VEHICLE INCLUDING THE SAME

(71) Applicants: HYUNDAI MOTOR COMPANY, Seoul (KR); Kia Corporation, Seoul (KR)

(72) Inventor: Kwon Taek Nam, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 24 days.

(21) Appl. No.: 18/958,653

(22) Filed: Nov. 25, 2024

(65) Prior Publication Data

US 2026/0021685 A1 Jan. 22, 2026

(30) Foreign Application Priority Data

Jul. 19, 2024 (KR) ........................ 10-2024-0095875

(51) Int. Cl.
*B60G 17/015* (2006.01)
*B60G 17/016* (2006.01)

(52) U.S. Cl.
CPC ....... *B60G 17/0157* (2013.01); *B60G 17/016* (2013.01); *B60G 2400/252* (2013.01)

(58) Field of Classification Search
CPC .............. B60G 17/0157; B60G 17/016; B60G 2400/252
See application file for complete search history.

(56) References Cited

U.S. PATENT DOCUMENTS 5,058,017 A * 10/1991 Adachi .................. B60G 21/08 280/5.514
5,999,868 A * 12/1999 Beno .................. B60G 17/0165 280/5.514
8,140,221 B2 3/2012 Becker et al.
11,685,220 B2 * 6/2023 Calchand ............. B60G 11/265 280/5.515
2004/0090019 A1 * 5/2004 Germain ............ B60G 17/0162 280/5.502
2004/0217561 A1 * 11/2004 Kondo ................. B60G 21/051 280/6.157
2008/0195278 A1 8/2008 Becker et al.
2011/0265683 A1 * 11/2011 Kurahashi ............... B61B 10/04 105/215.2

(Continued)

FOREIGN PATENT DOCUMENTS

EP 1955877 B1 5/2014
JP S61-169626 U 10/1986

(Continued)

*Primary Examiner* — Kurt Philip Liethen

(74) *Attorney, Agent, or Firm* — Fish & Richardson P.C.

(57) ABSTRACT

A frame assembly for a vehicle body includes a beam, axles, and vehicle height adjustment parts. The beam is configured to be connected to a lower portion of the vehicle body and extend in a width direction of the vehicle body. The axles are disposed at two opposite sides of the beam and configured to receive tires, the tires being mounted on the axles. The vehicle height adjustment parts are configured to be connected to the beam and the axles and configured to raise or lower the beam relative to the axles to thereby adjust a vehicle height, where the vehicle height corresponds to a height of the vehicle body with respect to a ground surface.

16 Claims, 4 Drawing Sheets

(56) References Cited

U.S. PATENT DOCUMENTS

| | | | | |
|---|---|---|---|---|
| 2012/0319366 | A1* | 12/2012 | Yagiela | B60G 17/019 280/6.157 |
| 2015/0028552 | A1 | 1/2015 | Seminara | |
| 2017/0158210 | A1* | 6/2017 | Katahira | B60G 3/20 |
| 2020/0406680 | A1* | 12/2020 | Suzuki | B60B 35/06 |
| 2023/0085585 | A1* | 3/2023 | Ryu | B60G 7/006 280/5.521 |

FOREIGN PATENT DOCUMENTS

| | | | |
|---|---|---|---|
| JP | H09-11728 | A | 1/1997 |
| JP | 2001-097017 | A | 4/2001 |
| KR | 10-0445989 | B1 | 8/2004 |
| KR | 10-2022-0040183 | A | 3/2022 |

* cited by examiner

FRAME ASSEMBLY AND VEHICLE INCLUDING THE SAME

CROSS-REFERENCE TO RELATED APPLICATION

This application claims priority to and the benefit of Korean Patent Application No. 10-2024-0095875, filed on Jul. 19, 2024, the disclosure of which is incorporated herein by reference in its entirety.

TECHNICAL FIELD

The present disclosure relates to a frame assembly and a vehicle including the same.

BACKGROUND

An interval or distance between a vehicle body and a ground surface may need to be adjusted depending on the use of a vehicle. For example, when items stored in the vehicle body need to be unloaded, or items need to be loaded into the vehicle body, a height of the vehicle body may need to be decreased to reduce the interval between the vehicle body and the ground surface. In other cases, the height of the vehicle body may need to be increased to widen the interval between the vehicle body and the ground surface, which may allow the vehicle to travel on rough roads or the like.

A vehicle height adjustment system may connect a beam and a vehicle body to adjust an interval between an axle of the vehicle and the vehicle body in order to increase or decrease a height of the vehicle body.

In some examples, due to a small gap between the vehicle body and the axle, the size of the gap that can be adjusted by the vehicle height adjustment system may be relatively small, causing difficulty in sufficiently lowering the height of the vehicle body to the targeted height.

SUMMARY

The present disclosure has been made in an effort to provide a vehicle capable of being substantially lowered to sufficiently decrease a height of a vehicle body with respect to a ground surface.

In order to achieve the above-mentioned objective, one aspect of the present disclosure can provide a frame assembly, which supports a vehicle body of a vehicle, the frame assembly including: a beam connected to a lower portion of the vehicle body and extending in a width direction of the vehicle body; axles disposed at two opposite sides of the beam based on the width direction and configured such that tires are mounted on the axles; and vehicle height adjustment parts configured to connect the beam and the axles and raise or lower the beam relative to the axles to adjust a vehicle height that is a height of the vehicle body with respect to a ground surface.

In addition, the vehicle height adjustment part can include: a first fixing region fixed to the axle; a second fixing region fixed to the beam and configured to connect the first fixing region and the beam; and a power providing region configured to provide power to the second fixing region to raise or lower the second fixing region relative to the first fixing region.

In addition, the second fixing region can extend in an upward/downward direction and have a lower portion fixed to the beam, the power providing region can include: an engagement part having an inner peripheral surface configured to engage with an outer peripheral surface of the second fixing region; and a motor configured to rotate the engagement part about a rotation axis extending in the upward/downward direction, any one of the outer peripheral surface of the second fixing region and the inner peripheral surface of the engagement part can be a spiral groove, and the other of the outer peripheral surface of the second fixing region and the inner peripheral surface of the engagement part can be a spiral protrusion configured to engage with the spiral groove.

In addition, the power providing region can include: a hydraulic cylinder having a cylinder hole provided to accommodate at least a part of the second fixing region; and a hydraulic pressure generation part configured to generate hydraulic pressure in the cylinder hole.

In addition, when an imaginary straight line, which passes through a center of the axle and extends in the width direction to define a rotation axis of the tire, is a first straight line, the beam can be disposed below the first straight line.

In addition, the frame assembly can further include: an interval adjustment part configured to connect the beam and the vehicle body and adjust an interval between the beam and the vehicle body in an upward/downward direction.

In addition, the axle can include: a first axle disposed at one side of the beam based on the width direction; and a second axle disposed at the other side of the beam based on the width direction, and the interval adjustment part can be disposed between the first axle and the second axle based on the width direction.

In addition, the frame assembly can further include: a controller configured to control the vehicle height adjustment part to adjust the vehicle height on the basis of information inputted by a driver of the vehicle.

Another aspect of the present disclosure can provide a vehicle including: a vehicle body; and a frame assembly configured to support the vehicle body, in which the frame assembly includes: a beam connected to a lower portion of the vehicle body and extending in a width direction of the vehicle body; axles disposed at two opposite sides of the beam based on the width direction and configured such that tires are mounted on the axles; and vehicle height adjustment parts configured to connect the beam and the axles and raise or lower the beam relative to the axles to adjust a vehicle height that is a height of the vehicle body with respect to a ground surface.

In addition, the vehicle height adjustment parts can each include: a first fixing region fixed to the axle; a second fixing region fixed to the beam and configured to connect the first fixing region and the beam; and a power providing region configured to provide power to the second fixing region to raise or lower the second fixing region relative to the first fixing region, the width direction can be defined as a direction parallel to a leftward/rightward direction, the axles can include: a first axle disposed at a left side of the beam; and a second axle disposed at a right side of the beam, the first fixing regions can include: a first-first fixing region fixed to a right side of the first axle; and a first-second fixing region fixed to a left side of the second axle, the vehicle body can include an overlap region that is a region that overlaps a part of the axle when one side of the vehicle based on the leftward/rightward direction is viewed in a direction parallel to the leftward/rightward direction, and a width of the overlap region based on the leftward/rightward direction can be smaller than a spacing distance between the first-first fixing region and the first-second fixing region in the leftward/rightward direction.

The vehicle including the frame assembly according to the present disclosure can be extremely lowered so that the height of the vehicle body with respect to the ground surface is sufficiently decreased.

In addition, the vehicle including the frame assembly according to the present disclosure makes it easy for a user, who is in a wheelchair, to get in or out of the vehicle.

In addition, the vehicle including the frame assembly according to the present disclosure makes it easy to load or unload parcel delivery items.

In addition, the vehicle including the frame assembly according to the present disclosure is manufactured not only to easily decrease the vehicle height but also to easily increase the vehicle height, which prevents the lower portion of the vehicle from interfering with the ground surface on the rough road.

DETAILED DESCRIPTION

Figure 1:
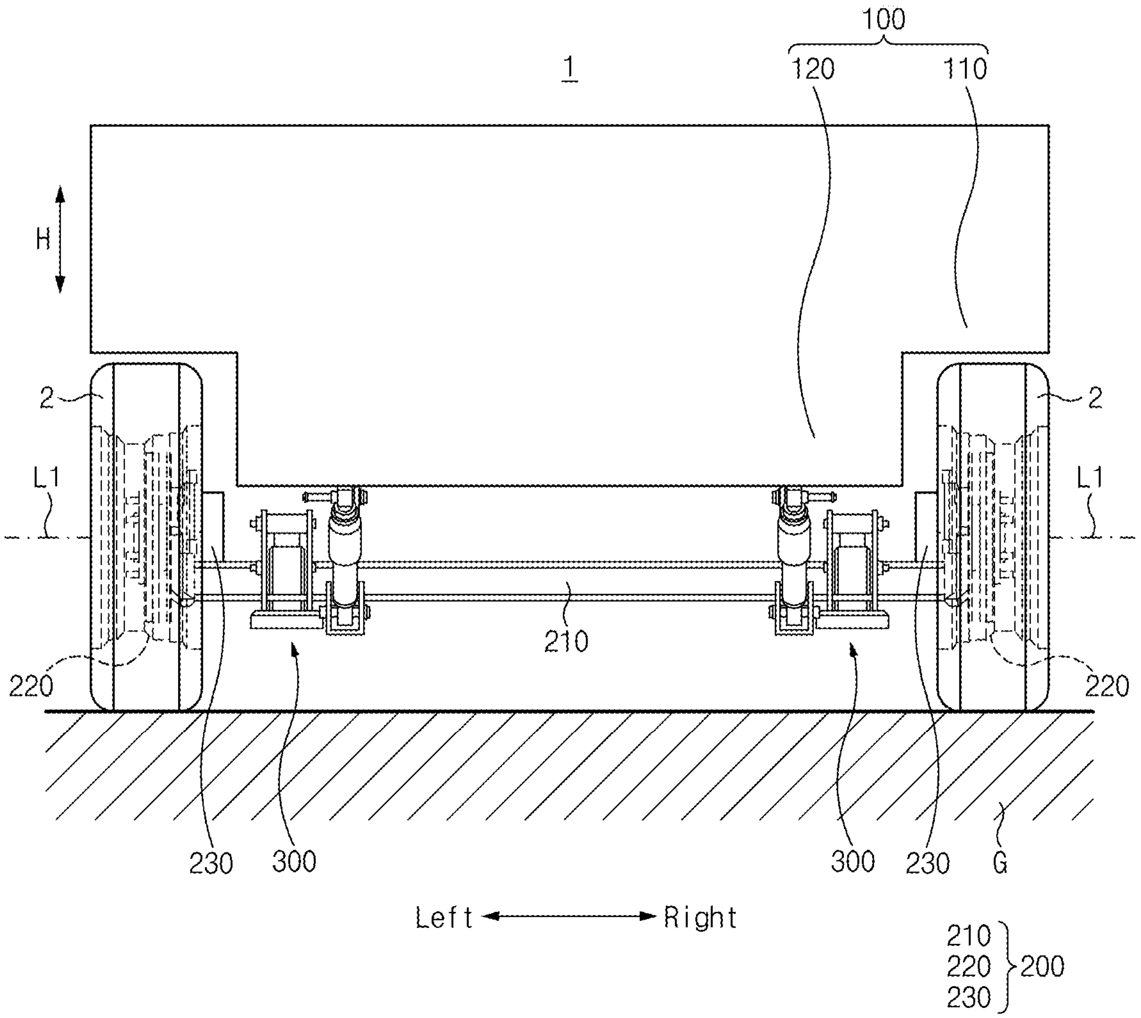
FIG. 1 illustrates a rear view of an example of a vehicle.

Hereinafter, implementations of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the implementations of the present disclosure, a detailed description of related publicly-known configurations or functions will be omitted when it is determined that the detailed description obscures the understanding of the implementations of the present disclosure.

Hereinafter, a vehicle 1 according to an implementation of the present disclosure will be described with reference to the drawings.

FIG. 1 is a rear view of the vehicle according to the implementation of the present disclosure.

With reference to FIG. 1, for example, the vehicle 1 can include a purpose-built mobility vehicle (purpose-built vehicle (PBV)). An internal space of the vehicle 1 can be utilized in various ways. For example, the vehicle 1 can be configured to provide a user's resting space, a mobile warehouse, a logistics delivery mobility vehicle, and the like. The vehicle 1 can include a vehicle body 100, a frame assembly 200, interval adjustment parts 300, and a controller.

The vehicle body 100 can define at least a part of an external appearance of the vehicle 1. The vehicle body 100 can define an accommodation space capable of accommodating a user or an object. The vehicle body 100 can be supported on the frame assembly 200. The vehicle body 100 can be disposed above the frame assembly 200. The vehicle body 100 can include a body region 110 and an overlap region 120.

The body region 110 can define a part of the vehicle body 100. The body region 110 can be disposed above the overlap region 120. In addition, the body region 110 can be disposed above tires 2. A width of the body region 110 in a leftward/rightward direction can be larger than a width of the overlap region 120 in a leftward/rightward direction. In addition, a width of the body region 110 in an upward/downward direction H can be larger than a width of the overlap region 120 in the upward/downward direction H.

The overlap region 120 of the vehicle body 100 can overlap the tire 2 in the leftward/rightward direction. The leftward/rightward direction can be defined as a direction parallel to a width direction of the vehicle 1. For example, at least a part of the overlap region 120 can overlap at least a part of each of axles 220, which will be described below, when the left or right side of the vehicle 1 is viewed in parallel with the leftward/rightward direction. The overlap region 120 can be connected to a beam 210, which will be described below, through the interval adjustment parts 300.

Figure 2:
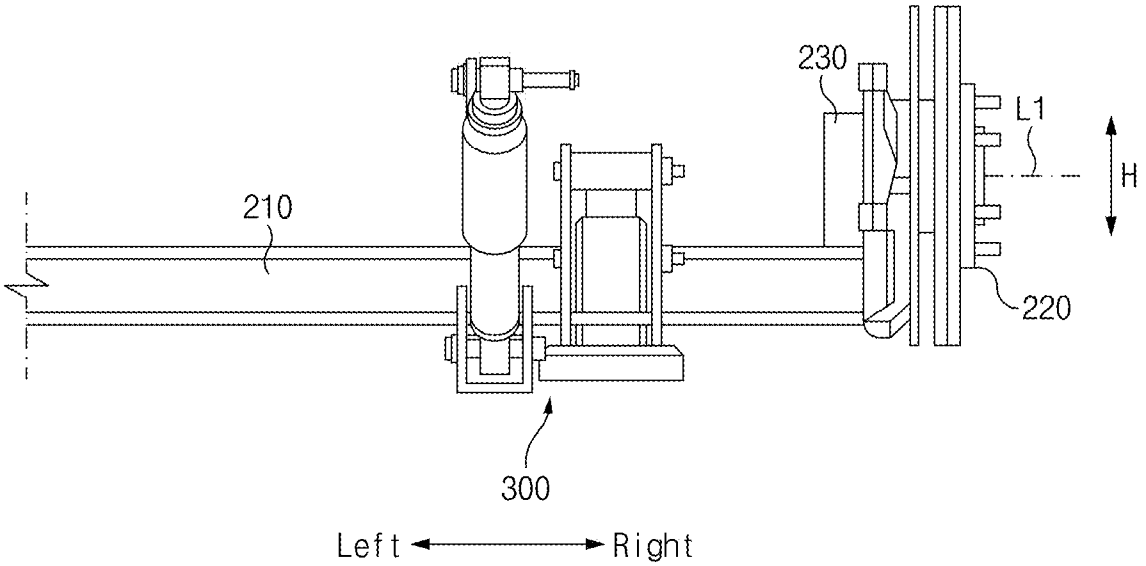
FIG. 2 illustrates a view of a rear side of an example of a vehicle, excluding a vehicle body.

FIG. 2 is a view illustrating a rear side of the vehicle excluding the vehicle body according to the implementation of the present disclosure.

With reference further to FIG. 2, the frame assembly 200 can support the vehicle body 100. The frame assembly 200 can define a lower portion of the vehicle 1. For example, the frame assembly 200 can be understood as a concept including frames and a suspension that constitute the lower portion of the vehicle 1. The frame assembly 200 can include the beam 210, the axles 220, and vehicle height adjustment parts 230.

The beam 210 can extend in the leftward/rightward direction. The axles 220 can be respectively disposed at two opposite sides of the beam 210 based on the leftward/rightward direction. For example, the beam 210 can be a torsion beam.

The tire 2 can be mounted on the axle 220. The axle 220 can provide a first rotation axis L1 that is a rotation axis of the tire 2. The first rotation axis L1 can be defined as a first straight line L1 that is an imaginary straight line passing through a center of the tire 2 and extending in the leftward/rightward direction. The beam 210 can be disposed below the first straight line L1. The axles 220 can be provided as a plurality of axles 220. The plurality of axles 220 can include a first axle and a second axle.

Figure 3:
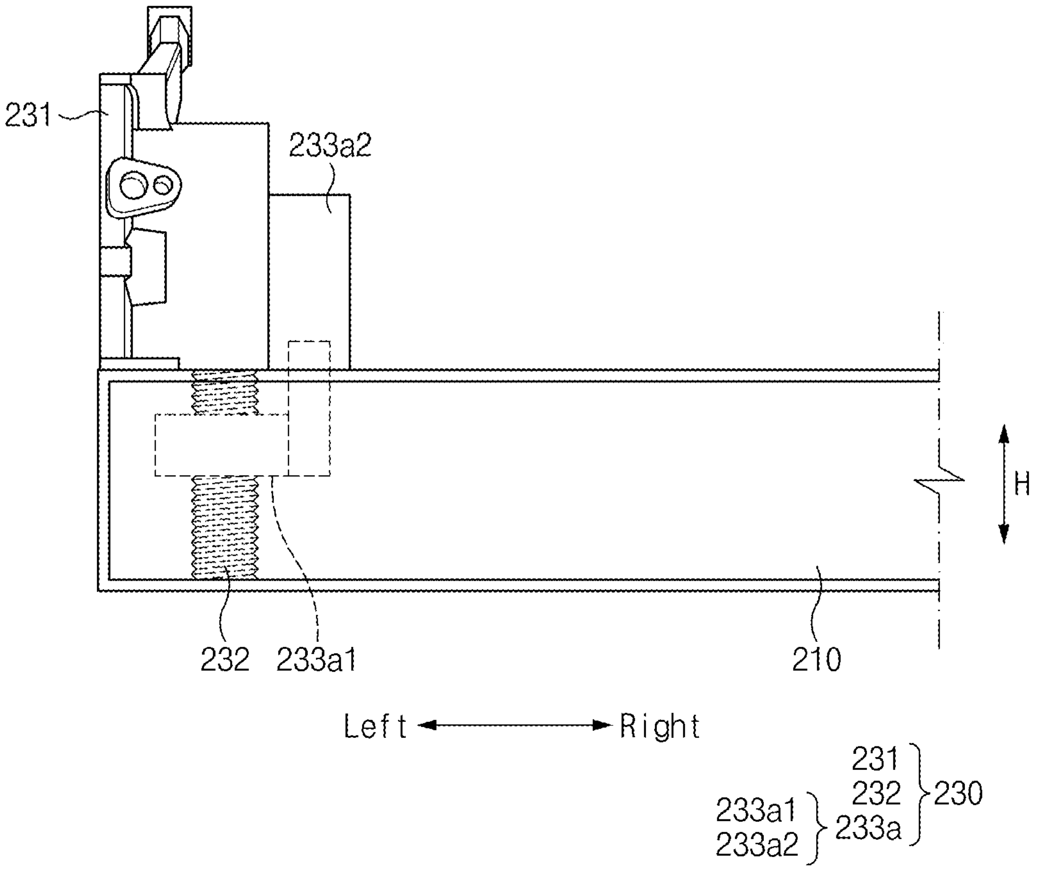
FIG. 3 illustrates an example of a beam and an example of a vehicle height adjustment part.

The first axle can be disposed at one side (e.g., the left side) of the beam 210 based on the leftward/rightward direction. The second axle can be disposed at the other side (e.g., the right side) of the beam 210 based on the leftward/rightward direction. The beam 210 can be disposed between the first axle and the second axle based on the leftward/rightward direction. FIG. 3 is a view illustrating the beam and the vehicle height adjustment part according to the implementation of the present disclosure.

With reference further to FIG. 3, the vehicle height adjustment part 230 can adjust a vehicle height that is a height of the vehicle body 100 with respect to a ground surface. The vehicle height adjustment part 230 can raise or lower the beam 210 relative to the axle 220. In addition, the vehicle height adjustment part 230 can connect the beam 210 and the axle 220. For example, the vehicle height adjustment part 230 can be disposed to be in contact with the axle 220 and one side of the beam 210 based on the leftward/rightward direction. The vehicle height adjustment part 230 can include a first fixing region 231, a second fixing region 232, and a power providing region 233*a*. In addition, the vehicle height adjustment parts 230 can be provided as a plurality of vehicle height adjustment parts 230. The vehicle height adjustment parts 230 can include a first vehicle height adjustment part configured to connect the first axle and the beam 210, and a second vehicle height adjustment part configured to connect the second axle and the beam 210.

The first fixing region 231 can be fixed to the axle 220. For example, the first fixing region 231 and the axle 220 can be disposed to face each other in the leftward/rightward direction. In a detailed example, one side surface of the first fixing region 231 based on the leftward/rightward direction can be connected to the other side surface of the axle 220 based on the leftward/rightward direction and be in contact with the other side surface of the axle 220 based on the leftward/rightward direction. The first fixing region 231 can be provided as a plurality of first fixing regions 231. The plurality of first fixing regions 231 can include a first-first fixing region provided on the first vehicle height adjustment part, and a first-second fixing region provided on the second vehicle height adjustment part.

A spacing distance between the first-first fixing region and the first-second fixing region in the leftward/rightward direction can be larger than a spacing distance of the overlap region 120 in the leftward/rightward direction. In other words, the overlap region 120 can be disposed between the first-first fixing region and the first-second fixing region based on the leftward/rightward direction.

The second fixing region 232 can be fixed to the beam 210. For example, a lower portion of the second fixing region 232 can be fixed to the beam 210. The second fixing region 232 can connect the first fixing region 231 and the beam 210. In addition, the first fixing region 231 can be configured to be movable in the upward/downward direction H relative to the second fixing region 232. In addition, the second fixing region 232 can be provided as a plurality of second fixing regions 232. The plurality of second fixing regions 232 can include a second-first fixing region configured to connect the first-first fixing region and the beam 210, and a second-second fixing region configured to connect the first-second fixing region and the beam 210.

The power providing region **233*a* can provide power to the second fixing region 232 to raise or lower the second fixing region 232 relative to the first fixing region 231. The power providing region 233*a* can be connected to the second fixing region 232 and configured to be movable in the upward/downward direction H. The power providing region 233*a* can include an engagement part 233*a*1 and a motor 233*a*2**.

The engagement part **233*al* can engage with the second fixing region 232. For example, an inner peripheral surface of the engagement part 233*al* can engage with an outer peripheral surface of the second fixing region 232. In a detailed example, any one of the outer peripheral surface of the second fixing region 232 and the inner peripheral surface of the engagement part 233*al* can be a spiral groove, and the other of the outer peripheral surface of the second fixing region 232 and the inner peripheral surface of the engagement part 233*al* can be a spiral protrusion configured to engage with the spiral groove. In a more detailed example, the second fixing region 232 can have a bolt shape, and the engagement part 233*al*** can have a nut shape.

A relative position of the engagement part **233*al* with respect to the first fixing region 231 can be fixed. In addition, the engagement part 233*al* can extend in the upward/downward direction H and rotate about a rotation axis passing through a center of the engagement part 233*al*. For example, when the engagement part 233*al* rotates in the first rotation direction, the second fixing region 232 can move downward relative to the engagement part 233*a*1. In a detailed example, when the second fixing region 232 moves downward relative to the engagement part 233*a*1, the beam 210 can move downward relative to the first fixing region 231**.

The motor **233*a*2 can provide the engagement part 233*al* with rotational power for rotating the engagement part 233*al*. The motor 233*a*2 can be fixed to the first fixing region 231. For example, the motor 233*a*2** can include a housing, a stator, a rotor, and a shaft.

The interval adjustment part 300 can adjust an interval between the beam 210 and the vehicle body 100 in the upward/downward direction H. The interval adjustment part 300 can connect the beam 210 and the overlap region 120. The interval adjustment part 300 can be controlled by the controller. The interval adjustment parts 300 can be provided as a plurality of interval adjustment parts 300. The plurality of interval adjustment parts 300 can be disposed to be spaced apart from one another in the leftward/rightward direction.

The controller can control the vehicle height adjustment parts 230. The controller can control the vehicle height adjustment parts 230 to adjust the vehicle height on the basis of information inputted from a driver of the vehicle 1. In other words, in case that the driver manually sends a vehicle height adjustment instruction signal to the controller, the controller can control the vehicle height adjustment parts 230 to increase or decrease the vehicle height on the basis of the vehicle height adjustment instruction signal.

In addition, the controller can control the vehicle height adjustment parts 230 on the basis of topographic information of a ground surface G. In other words, the controller can control the vehicle height adjustment parts 230 to automatically increase or decrease the vehicle height on the basis of the acquired topographic information as well as the driver's instruction.

The controller can be electrically connected to the vehicle height adjustment parts 230 and the interval adjustment parts 300 and implemented as a process that serves to decode and execute instructions on the basis of inputted information.

Hereinafter, a vehicle according to another example of the present disclosure will be described with reference to FIG. 4. The description of the vehicle according to another example of the present disclosure will be focused on a difference from the implementations of the present disclosure.

Figure 4:
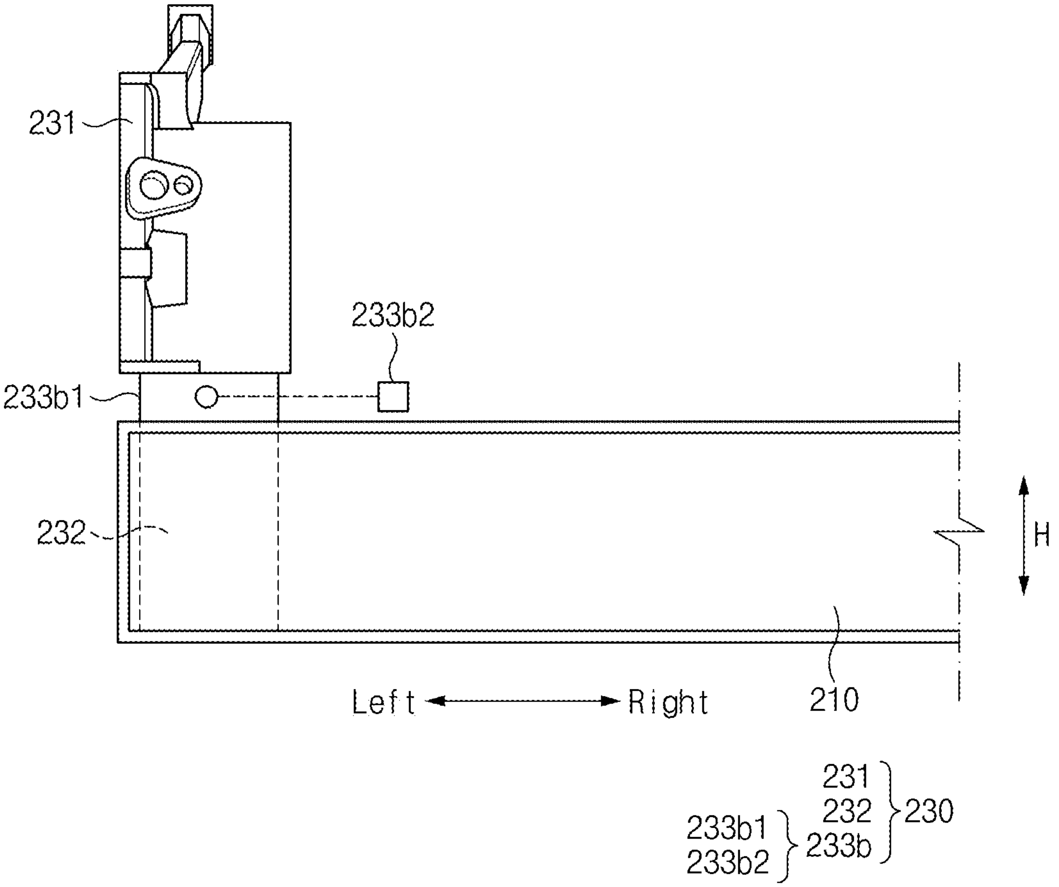
FIG. 4 illustrates an example of a beam and an example of a vehicle height adjustment part.

FIG. 4 is a view illustrating a beam and a vehicle height adjustment part according to another example of the present disclosure.

With reference to FIG. 4, the vehicle according to another example of the present disclosure can include a vehicle body, a frame assembly, interval adjustment parts, and a controller.

The descriptions of the vehicle body, the interval adjustment part, and the controller according to another example of the present disclosure can be replaced with the descriptions of the vehicle body 100, the interval adjustment part 300, and the controller according to the implementation of the present disclosure.

The frame assembly can include the beam 210, the axles, and the vehicle height adjustment parts 230. The descriptions of the beam 210 and the axle according to another example of the present disclosure can be replaced with the descriptions of the beam 210 and the axle 220 according to the implementation of the present disclosure.

The vehicle height adjustment part 230 according to another example of the present disclosure can include the first fixing region 231, the second fixing region 232, and a power providing region **233*b*. The description of the first fixing region 231 according to another example of the present disclosure can be replaced with the description of the first fixing region 231** according to the implementation of the present disclosure.

The second fixing region 232 can move in the upward/downward direction H relative to the first fixing region 231. For example, when the second fixing region 232 moves downward relative to the first fixing region 231, the beam 210 can move downward relative to the axle. In addition, when the second fixing region 232 moves upward relative to the first fixing region 231, the beam 210 can move upward relative to the axle.

The power providing region **233*b* can provide power to the second fixing region 232 to raise or lower the second fixing region 232 relative to the first fixing region 231. The power providing region 233*b* can be connected to the second fixing region 232 and configured to be movable in the upward/downward direction H. The power providing region 233*b* can include a hydraulic cylinder 233*b*1 and a hydraulic pressure generation part 233*b*2**.

The hydraulic cylinder **233*b*1 can have a cylinder hole capable of accommodating at least a part of the second fixing region 232. For example, the second fixing region 232 can move in the upward/downward direction H relative to the hydraulic cylinder 233*b*1 so as to be inserted into the cylinder hole or separated from the cylinder hole. In other words, the second fixing region 232 and the hydraulic cylinder 233*b*1** can serve as a piston and a cylinder.

The hydraulic pressure generation part **233*b*2 can generate hydraulic pressure in the cylinder hole. The hydraulic pressure generation part 233*b*2 can include a fuel storage part and a pump. The fuel storage part can store fuel required to operate the pump. For example, the fuel can be gasoline or diesel. The pump can pump a fluid (e.g., air) to the cylinder hole or recover the fluid from the cylinder hole. For example, in case that the pump pumps the fluid to the cylinder hole, the beam 210 can move downward relative to the axle. In addition, in case that the pump recovers the fluid from the cylinder hole, the beam 210** can move upward relative to the axle.

The above description is simply given for illustratively describing the technical spirit of the present disclosure, and those skilled in the art to which the present disclosure pertains will appreciate that various changes and modifications are possible without departing from the essential characteristic of the present disclosure. Therefore, the implementations disclosed in the present disclosure are provided for illustrative purposes only but are not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

What is claimed is:

1. A frame assembly for a vehicle body, the frame assembly comprising:

a beam that is configured to be connected to a lower portion of the vehicle body and extend in a width direction of the vehicle body;

axles disposed at two opposite sides of the beam and configured to receive tires that are mounted on the axles; and vehicle height adjustment parts that are configured to be connected to the beam and the axles and configured to raise or lower the beam relative to the axles to thereby adjust a vehicle height, the vehicle height corresponding to a height of the vehicle body with respect to a ground surface, wherein the beam is disposed below an imaginary straight line that passes through a center of an axle of the axles, extends in the width direction of the vehicle body, and defines a rotation axis of a respective tire of the tires.

2. The frame assembly of claim 1, wherein each of the vehicle height adjustment parts defines:

a first fixing region configured to be fixed to a respective axle of the axles, a second fixing region configured to be fixed to the beam and configured to connect the first fixing region and the beam, and a power providing region configured to provide power to the second fixing region to thereby raise or lower the second fixing region relative to the first fixing region.

3. The frame assembly of claim 2, wherein the second fixing region is configured to extend in an upward and downward direction and comprises a lower portion fixed to the beam, wherein the power providing region comprises:

an engagement part having an inner peripheral surface configured to engage with an outer peripheral surface of the second fixing region, and a motor configured to rotate the engagement part about a rotation axis extending in the upward and downward direction, and wherein, (i) one of the outer peripheral surface of the second fixing region or the inner peripheral surface of the engagement part defines a spiral groove, and (ii) the other of the outer peripheral surface of the second fixing region or the inner peripheral surface of the engagement part defines a spiral protrusion that is configured to engage with the spiral groove.

4. The frame assembly of claim 2, wherein the power providing region comprises:

a hydraulic cylinder that defines cylinder hole and is configured to accommodate at least a portion of the second fixing region via the cylinder hole; and a hydraulic pressure generation part configured to generate hydraulic pressure in the cylinder hole.

5. The frame assembly of claim 1, further comprising:

an interval adjustment part configured to connect the beam and the vehicle body and configured to adjust an interval between the beam and the vehicle body in an upward and downward direction.

6. The frame assembly of claim 5, wherein the axles comprise:

a first axle disposed at one side of the beam along the width direction of the vehicle body; and a second axle disposed at the other side of the beam along the width direction, and wherein the interval adjustment part is disposed between the first axle and the second axle along the width direction.

7. The frame assembly of claim 1, further comprising:

a controller configured to, based on an input of a driver of a vehicle, control the vehicle height adjustment parts to adjust the vehicle height.

8. A vehicle comprising:

a vehicle body; and a frame assembly configured to support the vehicle body, wherein the frame assembly comprises:

a beam that is connected to a lower portion of the vehicle body and extends in a width direction of the vehicle body, axles disposed at two opposite sides of the beam and configured receive tires, the tires being mounted on the axles, and vehicle height adjustment parts that are connected to the beam and the axles and configured to raise or lower the beam relative to the axles to thereby adjust a vehicle height, the vehicle height corresponding to a height of the vehicle body with respect to a ground surface, and wherein the frame assembly further comprises:

an interval adjustment part that is configured to connect the beam and the vehicle body and configured to adjust an interval between the beam and the vehicle body in an upward and downward direction.

9. The vehicle of claim 8, wherein the vehicle height adjustment parts comprise a first vehicle height adjustment part and a second vehicle height adjustment part, wherein each of the vehicle height adjustment parts defines:

a first fixing region fixed to a respective axle of the axles, a second fixing region that is fixed to the beam and connects the first fixing region and the beam, and a power providing region configured to provide power to the second fixing region to thereby raise or lower the second fixing region relative to the first fixing region, wherein the width direction corresponds to a direction that is parallel to a leftward and rightward direction along the beam, wherein the axles comprise:

a first axle disposed at a left side of the beam, and a second axle disposed at a right side of the beam, wherein the first fixing region of the first vehicle height adjustment part is fixed to a right side of the first axle and the first fixing region of the second vehicle height adjustment part is fixed to a left side of the second axle, wherein the vehicle body defines an overlap region, wherein the overlap region overlaps a portion of the respective axle along a direction that is parallel to the leftward and rightward direction, and wherein a width of the overlap region along the leftward and rightward direction is less than a distance between the first fixing region of the first vehicle height adjustment part and the first fixing region of the second vehicle height adjustment part along the leftward and rightward direction.

10. The vehicle of claim 8, wherein the frame assembly further comprises:

a controller configured to, based on an input of a driver of a vehicle, control the vehicle height adjustment parts to adjust the vehicle height.

11. A frame assembly for a vehicle body, the frame assembly comprising:

a beam that is configured to be connected to a lower portion of the vehicle body and extend in a width direction of the vehicle body;

a first axle that is disposed at the beam and configured to receive a tire, the tire being mounted on the first axle; and a vehicle height adjustment part that is configured to be connected to the beam and the first axle and configured to raise or lower the beam relative to the first axle to thereby adjust a vehicle height, the vehicle height corresponding to a height of the vehicle body with respect to a ground surface, wherein the vehicle height adjustment part defines:

a first fixing region configured to be fixed to the first axle, a second fixing region configured to be fixed to the beam and configured to connect the first fixing region and the beam, and a power providing region configured to provide power to the second fixing region to thereby raise or lower the second fixing region relative to the first fixing region, wherein the second fixing region is configured to extend in an upward and downward direction and comprises a lower portion fixed to the beam, wherein the power providing region comprises:

an engagement part having an inner peripheral surface configured to engage with an outer peripheral surface of the second fixing region; and a motor configured to rotate the engagement part about a rotation axis extending in the upward and downward direction, and wherein, (i) one of the outer peripheral surface of the second fixing region or the inner peripheral surface of the engagement part defines a spiral groove, and (ii) the other of the outer peripheral surface of the second fixing region or the inner peripheral surface of the engagement part defines a spiral protrusion that is configured to engage with the spiral groove.

12. The frame assembly of claim 11, wherein the power providing region comprises:

a hydraulic cylinder that defines cylinder hole and is configured to accommodate at least a portion of the second fixing region via the cylinder hole; and a hydraulic pressure generation part configured to generate hydraulic pressure in the cylinder hole.

13. The frame assembly of claim 11, wherein the beam is disposed below an imaginary straight line that passes through a center of the first axle, extends in the width direction of the vehicle body, and defines a rotation axis of the tire.

14. The frame assembly of claim 11, further comprising:

an interval adjustment part configured to connect the beam and the vehicle body and adjust an interval between the beam and the vehicle body in an upward and downward direction.

15. The frame assembly of claim 14, further comprising:

a second axle disposed at the beam, wherein the first axle and the second axle are disposed opposite sides of the beam along the width direction, and wherein the interval adjustment part is disposed between the first axle and the second axle.

16. The frame assembly of claim 11, further comprising:

a controller configured to, based on an input of a driver of a vehicle, control the vehicle height adjustment part to adjust the vehicle height.

* * * * *